K. VAN KOOY.
HARVESTER REEL.
APPLICATION FILED FEB. 10, 1910.
991,213.
Patented May 2, 1911.
2 SHEETS—SHEET 1.
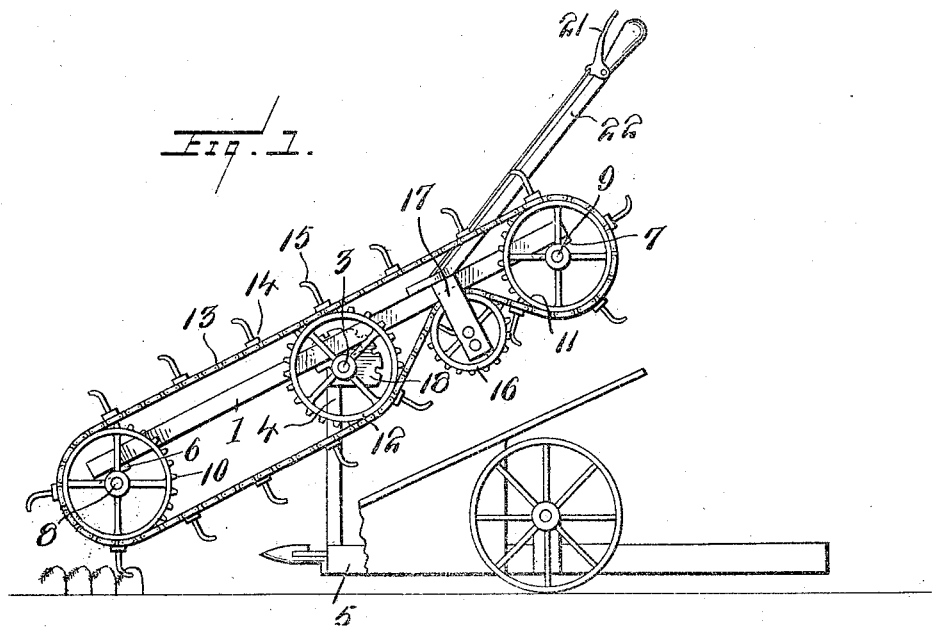
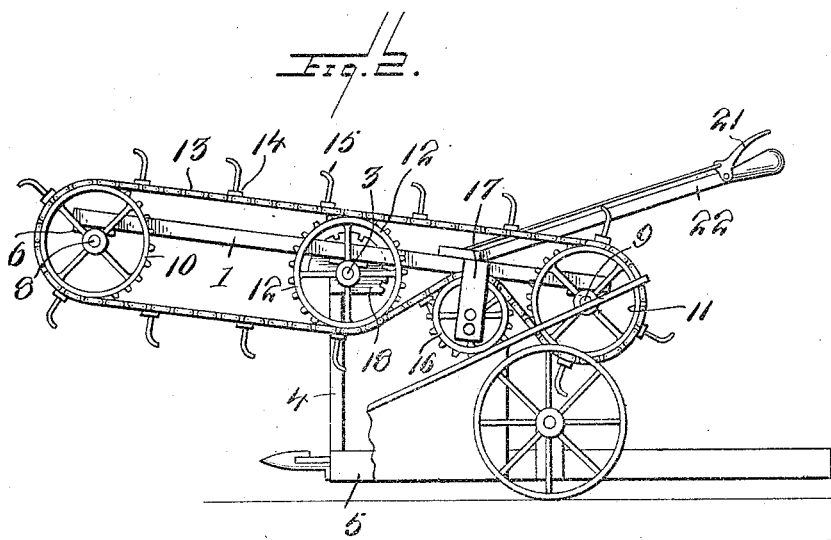

K. VAN KOOY.
HARVESTER REEL.
APPLICATION FILED FEB. 10, 1910.
991,213.
Patented May 2, 1911.
2 SHEETS—SHEET 2.
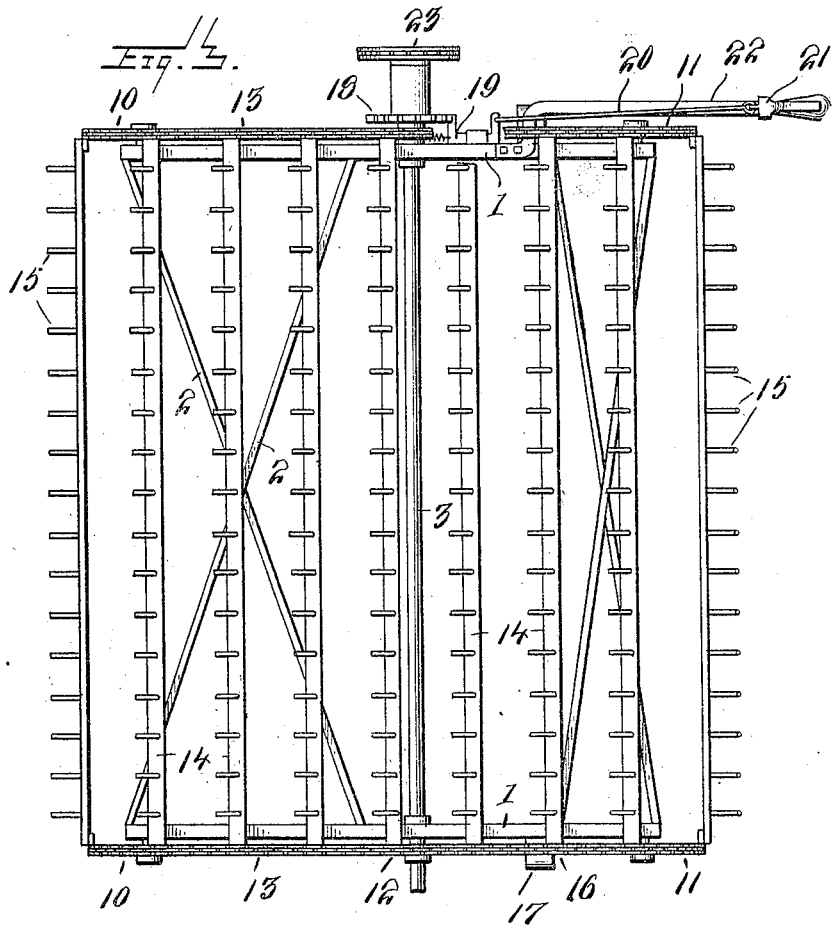
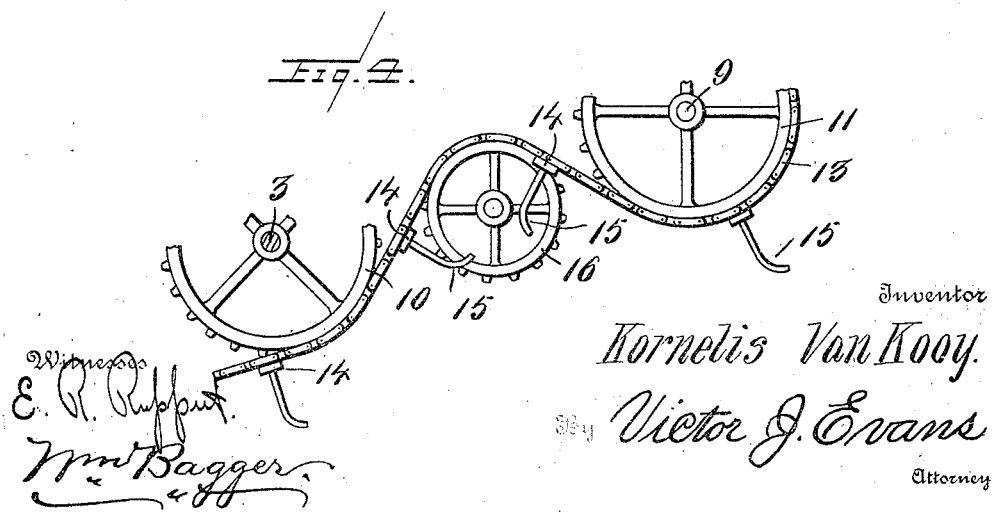
Witnesses
E. P. Ruppert
Wm. Bagger
Inventor
Kornelis Van Kooy
Victor J. Evans
Attorney

UNITED STATES PATENT OFFICE.

KORNELIS VAN KOOY, OF CLARA CITY, MINNESOTA.

HARVESTER-REEL.

991,213.

Specification of Letters Patent.

Patented May 2, 1911.

Application filed February 10, 1910. Serial No. 543,076.

*To all whom it may concern:*

Be it known that I, KORNELIS VAN KOOY, a subject of the Queen of the Netherlands, residing at Clara City, in the county of Chippewa and State of Minnesota, have invented new and useful Improvements in Harvester-Reels, of which the following is a specification.

This invention relates to harvester reels, and it has among its objects to provide a reel of the endless chain type which shall be simple in construction, durable and efficient in operation.

Other objects of the invention are to produce a reel of the character described which may be very readily adjusted to varying conditions of the grain to be operated upon, whether the latter be high or low, standing or down, and which shall be so constructed that the grain-engaging teeth will readily and surely become disengaged from the grain at the proper time, thus avoiding danger of choking.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a side elevation showing a portion of the harvester frame equipped with a reel constructed in accordance with the invention, said reel being adjusted to operate down grain. Fig. 2 is a similar view, showing the reel adjusted to operate standing grain. Fig. 3 is a top plan view, showing the reel detached. Fig. 4 is a side view in elevation, showing a detail of the invention.

Corresponding parts in the several figures are denoted by like characters of reference.

The frame of the improved reel may consist of side members 1, 1 which are connected and reinforced by means of diagonal braces 2, 2, whereby said side members are also spaced apart. The side members 1, 1 afford bearings for a transversely disposed shaft 3 which is also supported for rotation upon the frame of the machine, as indicated at 4, thus supporting the reel frame pivotally with reference to the machine frame and at a suitable distance above the platform 5.

The side members of the frame are provided adjacent to their front and rear ends with bearings 6 and 7 wherein are supported stub shafts or spindles 8, 9 carrying sprocket wheels 10 and 11. Similar sprocket wheels 12 are carried by the shaft 3, said sprocket wheels 12 being disposed in longitudinal alinement with the sprocket wheels 10 and 11. Chains 13, which are guided over the sprockets 10, 12 and 11 adjacent to the two sides of the frame, are provided at intervals with slats 14 having grain-engaging teeth 15 the points of which are curved in the direction of the movement of the chain to engage the grain whether the latter be down or standing. The lower lead of the chains 13 are guided over deflecting sprockets or idlers 16 which are adjustably supported upon brackets 17 intermediate the sprockets 12 and the rear sprockets 11.

One of the members 4 of the harvester frame upon which the shaft 3 is supported is provided with a segment rack 18 adapted to be engaged by a stop member 19 which is slidably supported upon one of the side members of the reel frame, said stop member being connected by a link 20 with a cam lever 21 pivotally supported upon a handle bar 22 which is secured upon the side member of the reel frame. It will be readily seen that the stop member 19 may be conveniently disconnected from the segment rack 18, thus permitting the reel frame to be tilted by means of the handle bar 22 to any of the different positions indicated in the drawings or to various other positions that may be desired.

The shaft 3 is provided at one end with a sprocket wheel 23 enabling it to receive motion by means of a chain or link belt from some driven or rotary part of the harvester structure.

From the foregoing description, taken in connection with the drawings hereto annexed, the operation and advantages of this invention will be readily understood. It will be seen that by tilting the forward end of the reel frame in a downward direction, grain that is down will be engaged by the teeth 15 upon the slats connecting the endless chains, thus elevating such grain and presenting it properly to the cutting mechanism of the harvester. Standing grain may be successfully operated upon by lifting or elevating the forward end of the reel frame. The tooth-carrying slats of the lower leads of the chains in passing over the idlers 16 will be tilted in such a manner that the teeth of said slats will be effectively disconnected from the grain, thus positively preventing choking of the device while in action.

Having thus described the invention, what is claimed as new, is:—

1. In a grain harvester, a frame, a grain platform, a driven shaft supported for rotation in the frame above and adjacent to the platform, a reel frame supported pivotally upon the shaft, sprocket wheels upon the shaft adjacent to the sides of the reel frame, sprocket wheels supported adjacent to the sides of the reel frame at the front and rear ends thereof, chains guided over the sprocket wheels, slats connecting said chains, teeth upon said slats having hook-shaped points curved in the direction of the movement of the chains, and guiding sprockets intermediate the front and rear ends of the frame and above the normal path of the lower leads of the chains, engaging said lower leads and deflecting the same upwardly to such an extent that the chains after leaving the highest position will place the hook-shaped ends of the teeth in discharging position.

2. In a harvester reel including a pivotally supported frame having sprocket wheels, chains guided over said sprocket wheels, slats connecting the chains, and teeth upon said slats having hook-shaped points curved in the direction of the movement of the chains, and guiding sprockets supported to engage the lower leads of the chains intermediate the front and rear ends of the frame to deflect said chains upwardly from the platform and to deflect the teeth of the slats toward the axis of the guiding sprockets, said guiding sprockets being supported above the normal path of the lower leads of the chains sufficiently so that the chains after leaving the highest position will place the hook-shaped teeth in discharging position.

In testimony whereof I affix my signature in presence of two witnesses.

KORNELIS van KOOY.

Witnesses:
A. J. PRINO,
C. S. SMITH.